(12) United States Patent
Graham et al.

(10) Patent No.: US 7,421,542 B2
(45) Date of Patent: Sep. 2, 2008

(54) TECHNIQUE FOR DATA CACHE SYNCHRONIZATION

(75) Inventors: Mickael J. Graham, Lincoln, MA (US);
Anton Okmianski, Lincoln, MA (US);
Gregory F. Morris, Nashua, NH (US);
Joshua B. Littlefield, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 11/344,679

(22) Filed: Jan. 31, 2006

(65) Prior Publication Data

US 2007/0180194 A1    Aug. 2, 2007

(51) Int. Cl.
*G06F 13/16* (2006.01)

(52) U.S. Cl. .................................... 711/141

(58) Field of Classification Search ............. 711/141, 711/119; 709/218
See application file for complete search history.

(56) References Cited

U.S. PATENT DOCUMENTS

| | | | |
|---|---|---|---|
| 5,446,888 | A | 8/1995 | Pyne |
| 5,919,247 | A | 7/1999 | Van Hoff et al. |
| 6,317,775 | B1 | 11/2001 | Coile et al. |
| 6,412,007 | B1 | 6/2002 | Bui et al. |
| 6,442,608 | B1 | 8/2002 | Knight et al. |
| 6,631,137 | B1 | 10/2003 | Lorrain et al. |
| 6,832,253 | B1 | 12/2004 | Auerbach |
| 6,839,809 | B1 | 1/2005 | Forster et al. |
| 6,925,504 | B1 | 8/2005 | Liskov et al. |
| 6,981,029 | B1 | 12/2005 | Menditto et al. |
| 6,983,288 | B1 | 1/2006 | Kirkwood et al. |
| 2002/0178330 | A1 | 11/2002 | Schlowsky-Fischer et al. |
| 2003/0191719 | A1 | 10/2003 | Ginter et al. |
| 2004/0128346 | A1* | 7/2004 | Melamed et al. ............ 709/203 |
| 2004/0143710 | A1 | 7/2004 | Walmsley |

OTHER PUBLICATIONS

"OSD-Describing Software Packages on the Internet", BMC Software, Inc., 2005, pp. 1-10.

van Hoff, A., et al., "The HTTP Distribution and Replication Protocol", Aug. 25, 1997, pp. 1-14.

Campbell, B., "Marimba and Software License Compliance", Marimba Inc., Sep. 24, 2003, pp. 1-7.

"Marimba Desktop/Mobile Change Management Security Concepts", Marimba Inc., 2003, pp. 1-10.

(Continued)

*Primary Examiner*—Kevin L Ellis
(74) *Attorney, Agent, or Firm*—Hamilton, Brook, Smith & Reynolds, P.C.

(57) ABSTRACT

A technique for synchronizing data caches. Data is maintained in the data caches as records. The records are associated with buckets which represent collections of one or more records. The buckets are collectively maintained in a synchronization set which represents a state of a data cache. A local entity synchronizes its data cache with a remote entity by sending its synchronization set to the remote entity in a synchronization request message. The remote entity compares information contained in the local entity's synchronization set with its own to determine if the two are consistent. If not, the remote entity notes inconsistencies in a response message that is then forwarded to the local entity. The local entity processes the response message including using it to update its data cache to be consistent with the remote entity's data cache.

20 Claims, 10 Drawing Sheets

OTHER PUBLICATIONS

"Continuous Policy-Based Change and Configuration Management", Marimba, Inc., 2004, pp. 1-17.

"Marimba® Inventory Management Module An Overview", Marimba, Inc., 2002, pp. 1-5.

"Marimba Desktop/Mobile Management and Server Change Management Security Target", BMC Software, Inc., May 26, 2005, pp. 1-46.

Tridgell, A., "Efficient Algorithms for Sorting and Synchronization", A thesis submitted for the degree of Doctor of Philosophy at The Australian National University, Feb. 1999, pp. 1-106.

Bellare, M., et al., "Incremental Cryptography: The Case of Hashing and Signing", Appears in Advances in Cryptology—Crypto 94 Proceedings Lecture notes in Computer Science vol. 839, Springer-Verlag, Oct. 20, 1995, pp. 1-19.

Christoffel, J., "Bal—A Tool to Synchronize Document Collections Between Computers", Proceedings of the 11th Systems Administration Conference (LISA '97), Oct. 1997, pp. 1-7.

"RSYNC Frequently Asked Questions", http://samba.anu.edu.au/rsync/FAQ.html, pp. 106.

* cited by examiner

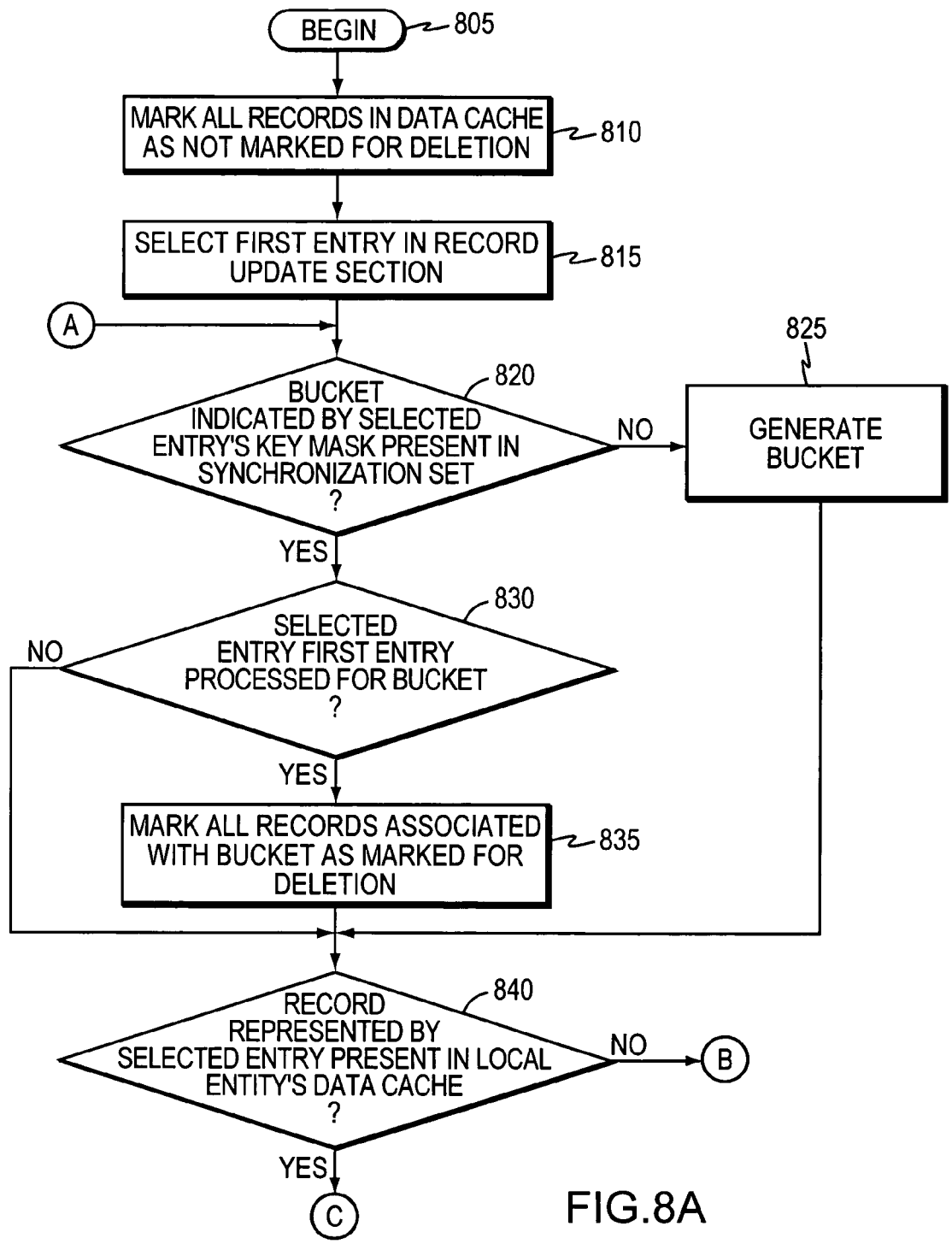

TECHNIQUE FOR DATA CACHE SYNCHRONIZATION

FIELD OF THE INVENTION

The present invention relates to data caches and in particular to synchronizing data caches.

BACKGROUND OF THE INVENTION

A communication network is a geographically distributed collection of nodes interconnected by communication links and segments for transporting communications (e.g., data, voice, video) between communication units (end nodes), such as personal computers, certain telephones, personal digital assistants (PDAs), video units and the like. Many types of communication networks are available, with the types ranging from local area networks (LANs) to wide area networks (WANs). LANs typically connect nodes over dedicated private communications links located in the same general geographical location, such as a building or campus. WANs, on the other hand, typically connect large numbers of geographically dispersed nodes over long-distance communications links, such as common carrier telephone lines. The Internet is an example of a WAN that connects networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol is a set of rules defining how the nodes interact with each other.

A data cache is a collection of data which duplicates original values that are typically stored elsewhere on a computer system or in a communication network where the original data are expensive, usually in terms of access time, to fetch or compute relative to fetching the data from the data cache. Once data is stored in a data cache, future use can be made by accessing the cache copy rather than re-fetching or re-computing the original data so that the average access time associated with accessing the data is lower. Data caches have proven extremely effective in areas of computing where access patterns to data in typical computer applications mean that the same data are often used several times or that data near to each other are accessed close together in time.

A data cache typically comprises a pool of entries wherein each entry holds data which is a copy of original data that is usually stored in a backing store. When a cache client wishes to access the data, presumably in the backing store, a check is performed to determine if the data resides in the cache. If the data is found in the cache, the cache copy of the data is returned to the client instead of the backing store version of the data. This situation is commonly referred to as a "cache hit" situation, meaning that the client "hit" on the data in the data cache (and consequently did not have to fetch the data from the backing store).

Alternatively, a "cache miss" is a situation where the data cache is consulted and found not to contain the data. In this situation, the data is typically fetched from the backing store and presented to the client. In addition, a copy of the data may be placed in the data cache to avoid incurring a cache miss the next time the data is accessed.

Data caches typically have limited storage, thus, in some situations data that is moved from the backing store to the cache will displace other data already in the cache. The data that is displaced is often selected on the basis of a replacement policy. One commonly used replacement policy is the well-known "least recently used" (LRU) policy. In accordance with the LRU policy, when old data in the cache needs to be displaced to make way for new data, the least recently used data in the cache is the data that is displaced.

When data is written to the data cache, at some point in time it is eventually written to the backing store as well. Writing data to the backing store is typically controlled by what is often referred to as a "write policy." Two well-known write policies that are often employed by data cache systems include the "write-through" policy and the "write-back" policy.

The write-through policy typically involves writing the data to the backing store at the time that the data is being written to the data cache. Thus, in a data cache that employs a write-through policy, the data contained in the data cache is said to be consistent (in agreement) with the data contained in the backing store. The write-back policy typically involves writing the data to the backing store when the data is being displaced by other data based on the data cache's replacement policy. Here, the data in the data cache and the backing store may be "inconsistent," that is, not in agreement.

Some communication networks employ distributed caches where a node in the network (usually called a central node) maintains a master copy of the cache which is distributed to other nodes in the network (usually called distributed nodes) for their use. In such arrangements, it is important that the data in the master copy be in synchronization with the copies maintained at the distributed nodes. Moreover, it may be important that the data caches be kept in synchronization in a near real time manner thus warranting that the data caches be quickly re-synchronized after problems caused by, e.g., intermittent connections between the central node and the distributed nodes.

One technique that may be used to synchronize data caches in a distributed caching system involves a bulk transfer of data contained in the central node's data cache to each of the distributed nodes. Here, the content of the central node's data cache is transferred "in bulk" to each distributed node which copies the contents to its data cache, overwriting its data cache's previous contents.

Another technique that may be used to synchronize data caches in a distributed caching system involves the use of revision numbers which reflect a version of data contained in the data caches. Here, each data cache may comprise one or more records configured to hold data in the cache. Each record is associated with a key which represents the data in the record and a revision number which represents a version of the data in the record. Each time the content of a particular record changes (e.g., data in the record is added, modified or deleted), its revision number is updated. To synchronize the content of the central node's data cache with a distributed node's data cache, the distributed node transfers the revision numbers and keys for all its data cache records to the central node. The central node uses this information to identify records that are out of date on the distributed node. The central node then transfers an updated copy of the identified out of date records to the distributed node.

Yet another technique that may be used to synchronize data caches in a distributed caching system involves the use of messages which are used by a central node to update data in caches located in the distributed nodes. Here, when information contained in a record changes in the central node's data cache, the change is propagated to the distributed nodes using messages which are acknowledged by the distributed nodes. If a distributed node has not acknowledged a change after some predetermined period of time, the central server may resend the change to the distributed node. The central node may maintain lists to track which distributed nodes have which changes.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A-B are a flowchart of a sequence of steps that may be used to process a cache synchronization reply message in accordance with an aspect of the present invention.

DETAILED DESCRIPTION OF THE INVENTION

Figure 1:
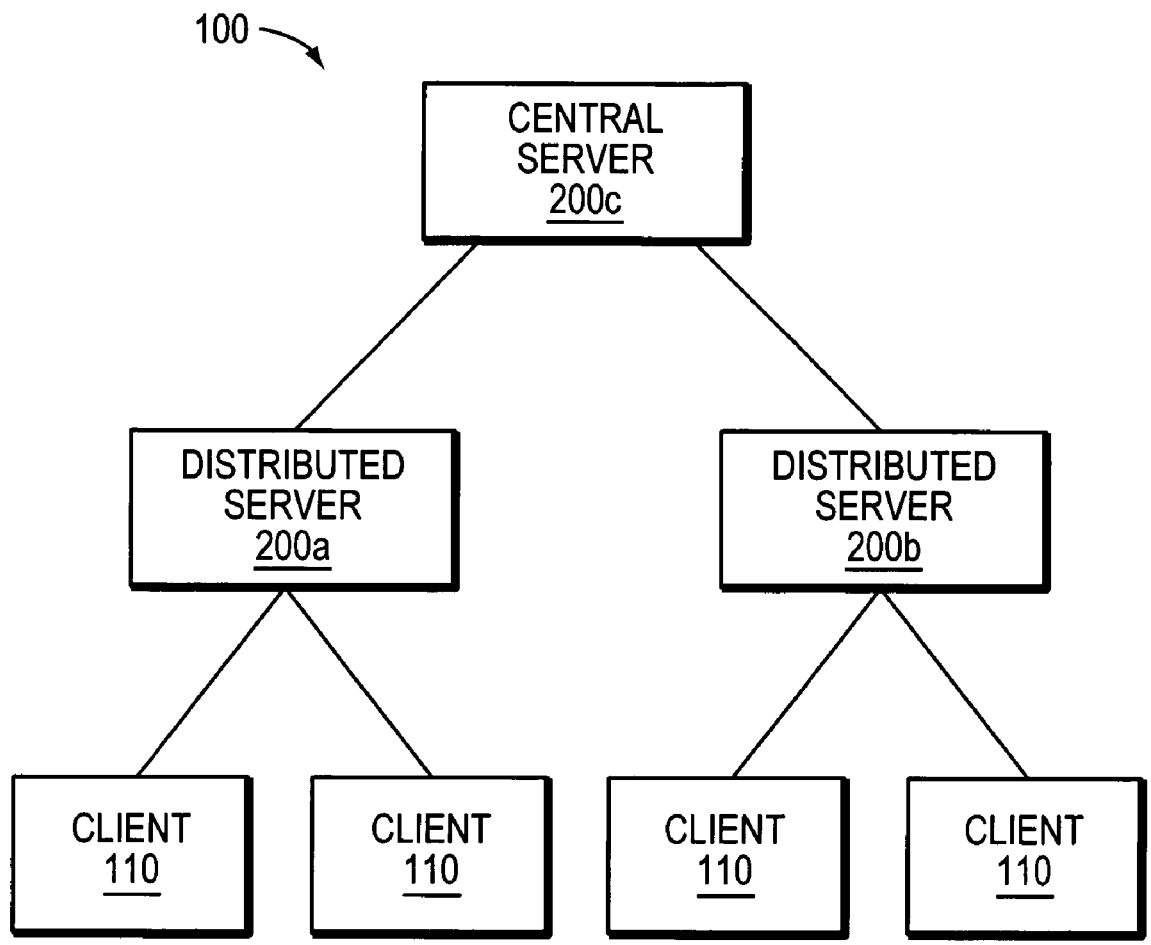
FIG. 1 is a block diagram of an exemplary communication network that may be used with the present invention.

A description of preferred embodiments of the invention follows.

One problem associated with the above-described techniques is that they are somewhat inefficient. For example, synchronizing data caches using a bulk transfer of data may consume large amounts of network resources and is generally inefficient if only a small portion of the data in the caches differ. Dividing the data cache into records and utilizing key and sequence numbers associated with records to limit the amount of data transferred from a central node to distributed nodes is helpful in that it acts to reduce the amount of traffic from the central node to the distributed node, however, this technique typically requires that all the keys and sequence numbers for all the records from all of the distributed nodes be sent to the central node which may still cause an inordinate amount of traffic to be carried on the network to accommodate synchronization. Likewise, using messages to report changes in the central node's data cache to the distributed nodes and requiring the distributed nodes to respond with acknowledgment messages may further lead to the generation of a significant amount of traffic on the network and much complexity due to having to track responses.

The present invention overcomes shortcomings associated with the prior art by incorporating an efficient technique for synchronizing information contained in data caches. According to an aspect of the technique, a first data cache is synchronized with a second data cache by generating synchronization sets for each of the data caches wherein the synchronization set for a particular data cache represents information contained in that cache. The synchronization set for the first data cache is compared with the synchronization set for the second data cache to identify inconsistencies with regards to information contained in the caches. These identified inconsistencies are used to update information contained in the first data cache to be consistent with information contained in the second data cache.

In an embodiment of the invention, data is maintained in records contained in data caches at a local entity and a remote entity. Each record is associated with (1) a key which identifies the record's data and (2) a sequence number which identifies a revision of the record's data. Each record is assigned to a bucket which is a logical entity that is configured to associate records that share common characteristics that meet a criterion (e.g., key mask) used to assign the records to the bucket. An amount of the records associated with each bucket is maintained for each bucket. In addition, a summary is generated for each bucket wherein the summary represents a summary (checksum) of the records assigned to the bucket.

The remote entity contains a "master" copy of data in its cache that is considered an authoritative store of the data. The contents of the data cache at the local entity is synchronized with the contents of the data cache at the remote entity by (1) generating a synchronization set at the local entity and a synchronization set at the remote entity wherein each synchronization set contains information that represents the information contained in their respective data caches (e.g., key mask, number of records and summary information for each bucket in their respective data caches), (2) forwarding the local entity's synchronization set to the remote entity, (3) at the remote entity, comparing the local entity's synchronization set with the remote entity's synchronization set to identify inconsistencies between the data contained in the local entity's data cache and the data contained in the remote entity's data cache, (4) forwarding a response from the remote entity to the local entity wherein the response contains the identified inconsistencies (e.g., contains key and revision number information associated with records that are inconsistent between the local entity's cache and the remote entity's cache) and (5) updating information in the local entity's data cache using the identified inconsistencies contained in the response to make the contents of the local entity's data cache consistent with the contents of the remote entity's data cache.

Advantageously, the present invention does not require sending all of the data in a remote entity's cache to a local entity in order to synchronize the information in the data caches. Rather, a summary (synchronization set) that represents the data in a local entity's data cache is sent to a remote entity in order to identify inconsistencies between the local entity's data cache and the remote entity's data cache. The identified inconsistencies are used to identify and limit the amount of data that is sent from the remote entity to the local entity in order to make the local entity's data cache consistent with the remote entity's data cache.

FIG. 1 is a high-level block diagram of an exemplary communication network 100 that may be used to implement the present invention. Network 100 comprises a plurality of nodes including client nodes 110 and server nodes 200 coupled to form an internetwork of nodes. These internetworked nodes communicate utilizing various protocols, such as the Transmission Control Protocol/Internet Protocol (TCP/IP). A network protocol as used herein is a formal set of rules that define how data is exchanged between nodes in a communication network.

The client nodes 110 are conventional communication devices, such as personal computers, personal digital assistants (PDA) and the like. The client nodes 110 are coupled to distributed servers 200a-b and utilize software, such as web browsers, to access information provided by the servers, such as web pages, which the servers 200a-b maintain in distributed data caches. Distributed servers 200a-b are further coupled to central server 200c which maintains a master copy of the information in its data cache.

Figure 2:
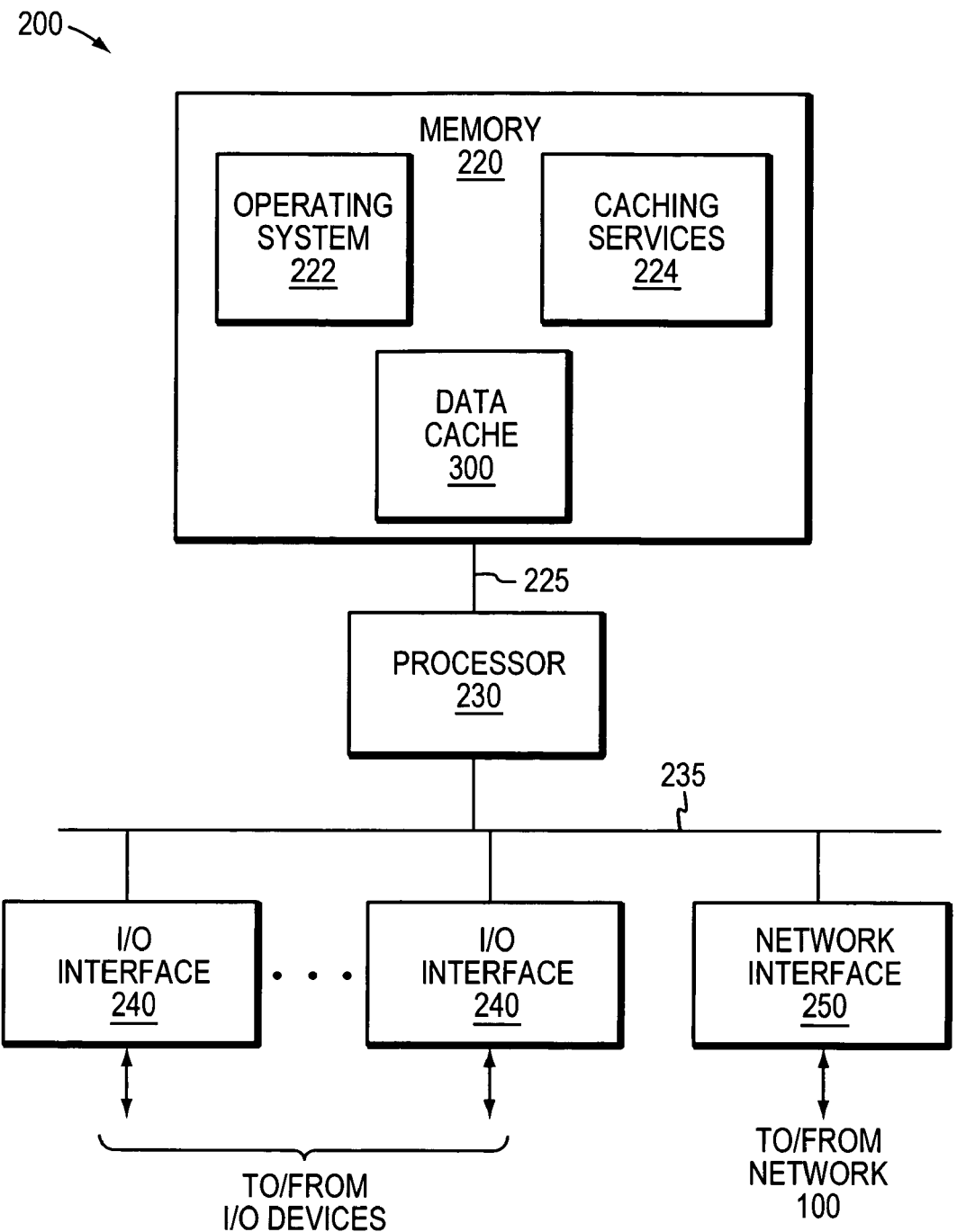
FIG. 2 is a high-level block diagram of an exemplary server that may be used with the present invention.

FIG. 2 is a high-level block diagram of an exemplary server 200 that may be used with the present invention. Server 200 comprises a memory 220, a processor 230, one or more input/output (I/O) interfaces 240 and a network interface 250. The memory 220 is coupled to the processor 230 via a memory bus 225 which enables data to be transferred between the memory 220 and the processor 230. The processor 230 is further coupled to the I/O interfaces 240 and the network interface 250 via an I/O bus 235 which enables data to be transferred between the processor and these interfaces 240, 250.

The processor 230 is a conventional central processing unit (CPU) configured to execute computer-executable instructions and manipulate data contained in memory 220 including instructions and data that implement aspects of the present invention. The I/O interfaces 240 comprise circuitry that interface the server 200 with various I/O devices (not shown), such as display units, keyboards, disk units and the like.

The network interface 250 comprises circuitry configured to implement a conventional network interface that enables data (e.g., packets) to be transferred between the server 200 and other entities (e.g., other servers 200, client nodes 110) in the network 100 using various protocols, such as Asynchronous Transfer Mode (ATM), Frame Relay (FR), Ethernet and so on. To that end, network interface 250 comprises conventional interface circuitry that incorporates signal, electrical and mechanical characteristics and interchange circuits needed to interface with the physical media of the network 100 and the various protocols running over that media.

The memory 220 is a computer-readable medium implemented as a random access memory (RAM) comprising RAM devices, such as dynamic RAM (DRAM) devices. Memory 220 contains various software and data structures used by the processor 230 including software and data structures that implement aspects of the present invention. Specifically, memory 220 includes an operating system 222, caching services 224 and a data cache 300.

The operating system 222 is a conventional operating system that comprises software configured to support the execution of processes (e.g., caching services 224) on processor 230. Specifically, operating system 222 is configured to perform various conventional operating system functions, such as enabling the processes to be scheduled for execution on the processor 230 as well as provide software services and controlled access to resources (e.g., the I/O devices) associated with server 200. Caching services 224 comprises software configured to manage data cache 300 as well as synchronize data contained in the data cache 300 with other data caches in network 100 in accordance with an aspect of the present invention.

Figure 3:
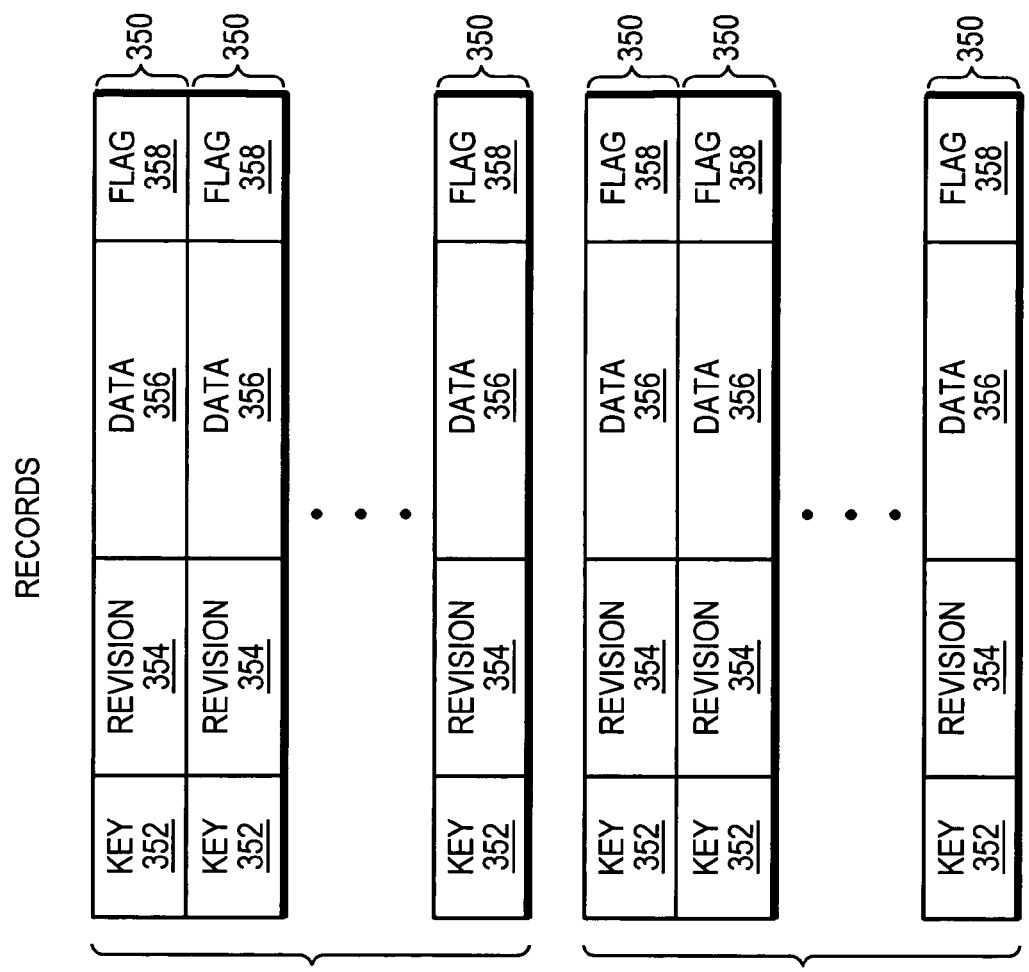
FIG. 3 is a partial block diagram of a data cache that may be used with the present invention.
Figure 3:
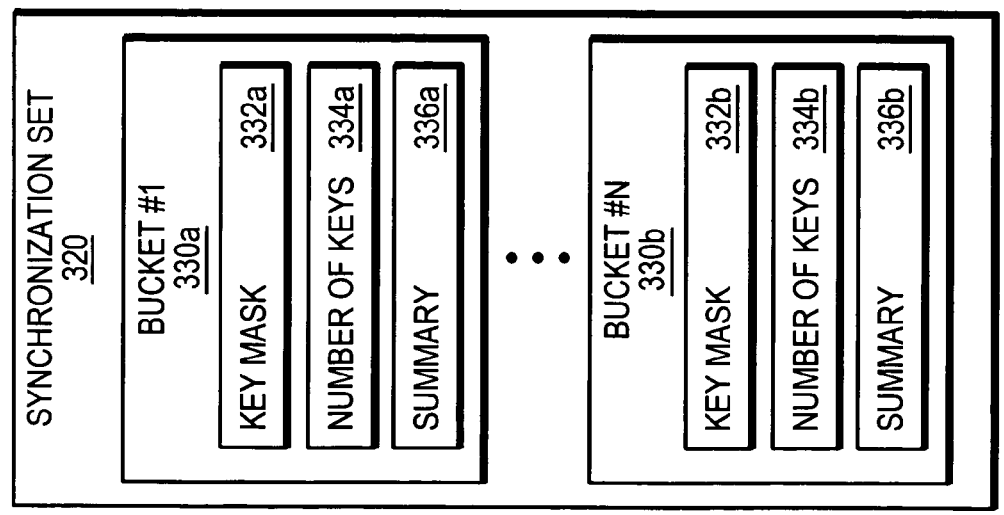

Data cache 300 is a data cache configured to hold information (data) that is encached by the server 200. FIG. 3 is a block diagram of a data cache 300 that may be used with the present invention. Data cache 300 comprises one or more records 350 wherein each record comprises a key field 352, a revision number field 354, a data field 356 and a flag field 358. The key field 352 holds a conventional key value that represents data contained in the data field 356. Techniques for generating a key value that represents data are well-known in the art. The revision number field 354 holds a value that represents a revision of the data contained in the data field 356. The data field 356 holds data (e.g., user data). The flag field 358 holds a flag that, as will be described further below, indicates whether a particular record in the cache 300 is marked for deletion. Illustratively, if the flag 358 is set (asserted) the record 350 is marked for deletion (i.e., it is to be purged from the data cache 300) and if the flag is cleared (not asserted) the record is not marked for deletion (i.e., it is not to be purged from the data cache 300).

The revision number 354 is updated whenever the data contained in the data field 356 is updated. Illustratively, the revision number 354 is incremented by one whenever the data in the data field 356 is revised (changed). Further, the revision number 354 does not repeat and is seeded based on a local date/time of the central server 200c. This ensures that the revision number is not rolled back to a previous value, after the central server 200c recovers from, e.g., a power down condition, a cold system restart or after a server database is recovered from backup.

Data cache 300 also comprises a synchronization set 320 which illustratively represents information contained in the data cache's records 350. The synchronization set 320 comprises buckets 330 wherein each bucket 330 represents a group of one or more records 350 that meet criteria set out by a key mask 332 associated with the bucket 330. Each bucket 330 comprises a key mask field 332, a number of keys field 334 and a summary field 336.

The key mask field 332 holds a value that represents the key mask associated with the bucket. This key mask sets out one or more criterions that are used to determine which records 350 in the data cache 300 are associated with (assigned to) the bucket 330. Illustratively, the key mask 332 acts as a template that is applied to record keys 352 to determine which records 350 are assigned to the bucket 330. If a particular record's key 352 matches the template, the record 350 is assigned to the bucket 330. Illustratively, the key mask 332 is unique for each bucket 330. Thus, the key mask 332 may act as an identifier of the bucket 330 and may be used to represent the bucket 330. As will be described further below, key masks 332 are used in this capacity to determine if particular buckets 330 exist in a given synchronization set 320.

The number of keys field 334 holds a value that represents a number of records 350 assigned to the bucket 330. The number of keys 334 is incremented and decremented as records are added to and deleted from the bucket 330, accordingly. Illustratively, the number of keys 334 is incremented by one for each record 350 assigned to the bucket 330. Likewise, if a record 350 is deleted from (no longer assigned to) a bucket 330, the number of keys 334 is decremented by one.

The summary field 336 holds a value that represents a summary of all the records assigned to the bucket 330. Illustratively, the summary 336 is an incremental checksum which is generated from a hash value that is generated by hashing the keys 352 and revision numbers 354 of records 350 logically assigned to the bucket 332 in combination with the number of keys 334 associated with the bucket 330. Hashing the key/revision number pairs acts to normalize their size and to provide a uniformly distributed input to the summary 336. In addition, including the key/revision number pairs introduces random input into the summary calculation process. This in combination with using the bucket's number of keys 334 in the calculation process provides a high degree of assurance as to the reliability of the summary 336.

Illustratively, the summary is generated using an incremental checksum technique. Examples of incremental checksum techniques that may be adapted for use with the present invention are described in "Internet Protocol", Request For Comments (RFC) 791, Internet Engineering Task Force (IETF), September 1981, pp. 1-45, which is available from the IETF, M. Bellare, et al., "Incremental Cryptography: The Case of Hashing and Signing", Advances in Cryptography—Crypto 94 Proceedings, Lecture Notes in Computer Science Vol. 839, Springer-Verlag, 1994, pp. 1-19 and M. Bellare, et al., "A New Paradigm for Collision-Free Hashing: Incrementally at Reduced Cost", November 1996, pp. 1-30 all of which are incorporated by reference in their entirety as though fully set forth herein. Employing an incremental checksum technique enables the summary 336 to be generated on an incremental basis thereby allowing records 350 to be assigned and deleted from the bucket 330 quickly and obviating having to generate a the summary 336 across the entire set of records 350 assigned to the bucket 330 each time a record 350 is added or deleted which may be compute and time intensive.

As will be described further below, the synchronization set 320 is used to determine if cache data 300 between two entities are synchronized, i.e., information (e.g., records 350) contained in the entities' data caches 300 is consistent. The combination of a bucket's key mask 332, number of keys 334 and summary 336 provide a unique signature for the bucket 330 which is used to represent the records 350 assigned to the bucket 330. If the signatures of two corresponding buckets 330 match between the entities, it can be concluded that the records 350 represented by the buckets 330 are in synchronization between the two entities. If the signatures of the two corresponding buckets 330 do not match, it can be concluded that the records 350 represented by the buckets 330 are not in synchronization between the entities.

It should be noted that functions performed by the servers 200, including functions that implement aspects of the present invention, may be implemented in whole or in part using some combination of hardware and/or software. It should be further noted that computer-executable instructions and/or computer data that implement aspects of the present invention may be stored in various computer-readable mediums, such as volatile memories, non-volatile memories, flash memories, removable disks, non-removable disks and so on. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on e.g., a communication network.

In accordance with an aspect of the present invention, a local entity (e.g., a distributed server 200a, 200b) initiates the process of synchronizing information contained in its data cache 300 with information contained in the data cache 300 of a remote entity (e.g., central server 200c) by conveying a copy of its synchronization set 320 to the remote entity in a synchronization message. The remote entity uses information contained in the conveyed synchronization set 320 to identify inconsistencies between information contained in the local entity's data cache 300 and the remote entity's data cache 300.

Figure 4:
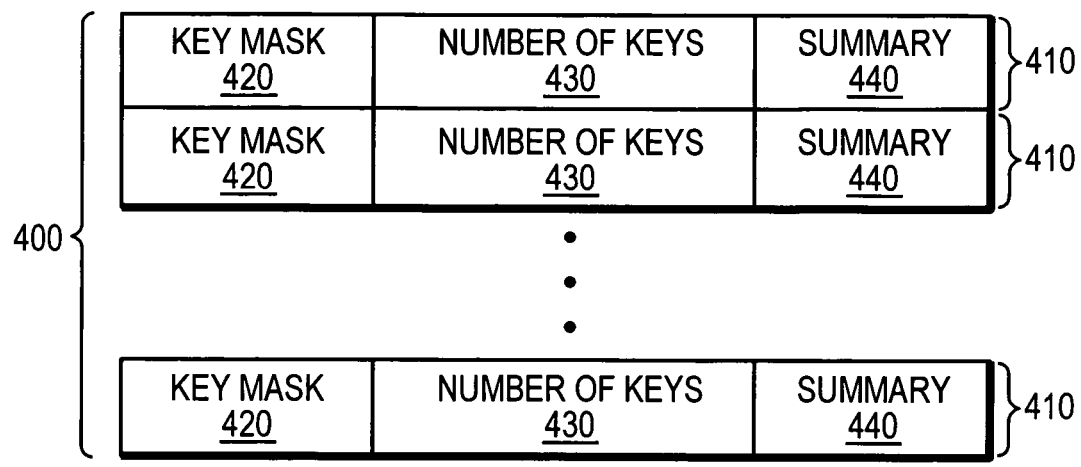
FIG. 4 is a block diagram of a cache synchronization request that may be used with the present invention.

FIG. 4 is a block diagram of a synchronization message 400 that may be used by a local entity to convey its synchronization set 320 to a remote entity in accordance with an aspect of the present invention. Message 400 comprises one or more entries 410 wherein each entry 410 is holds information associated with a bucket 330 in the local entity's synchronization set 320. Specifically, each entry 410 comprises a key mask field 420, a number of keys field 430 and a summary field 440 that hold the key mask 420, number of keys 430 and summary 440 fields, respectively, associated with a bucket 330. It should be noted that message 400 may contain other fields, such as a protocol header field which is used to transfer the message 400 through a communication network, such as network 100.

In response to receiving a synchronization message 400, the remote entity uses information contained in the synchronization message 400 to identify inconsistencies between the local entity's data cache 300 and the remote entity's data cache 300. These inconsistencies may include various records 350 that need to be added, updated or deleted in the local entity's data cache 300. The remote entity conveys the identified inconsistencies to the local entity using a synchronization reply message.

Figure 5:
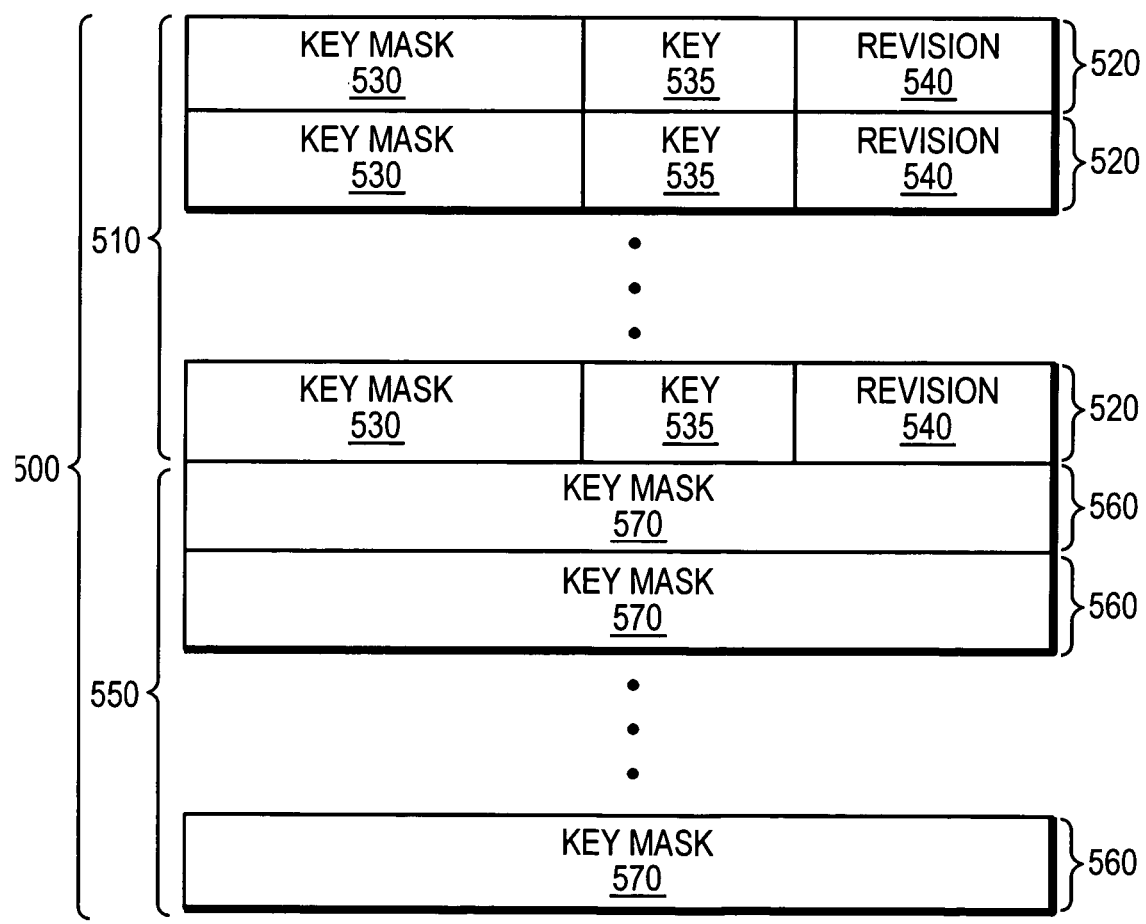
FIG. 5 is a block diagram of a cache synchronization reply message that may be used with the present invention.

FIG. 5 is a block diagram of a synchronization reply message 500 that may be used with the present invention. The synchronization reply message 500 comprises information that that identifies records that may need to be added, updated or deleted in the local entity's data cache 300 in order to make information contained in the local entity's data cache 300 consistent with information contained in the remote entity's data cache 300. Specifically, message 500 comprises a record update section 510 and a delete record section 550. The record update section 510 comprises information that represents records 350 that may need to be added or updated at the local entity. The delete record section 550 comprises information that represents groups of records 350 that need to be deleted at the local entity. It should be noted that message 500 may contain other sections, such as a protocol header section that contains protocol header information which is used to convey the message 500 through a communication network, such as network 100.

The record update section 510 contains one or more entries 520 wherein each entry 520 holds information that represents a record 350 that may need to be added or updated in the local entity's data cache 300. Each entry 520 comprises a key mask field 530, a key field 535 and a revision field 540. The key field 535 and revision field 540 hold values that represent the key 352 and revision 354 of the record 350 represented by the entry 520. The mask field 530 holds a key mask of a bucket 330 that is associated with the record 350 represented by the key 535 and revision 540 fields.

The delete record section 550 contains one or more entries 560 wherein each entry 560 comprises a key mask field 570. The key mask field 570 holds a value that represents a key mask 332 of a bucket 330 in the local entity's data cache 300. As will be described further below, records 350 associated with the bucket 330 represented in the key mask field 570 are deleted in the local entity's data cache 300.

Figure 6:
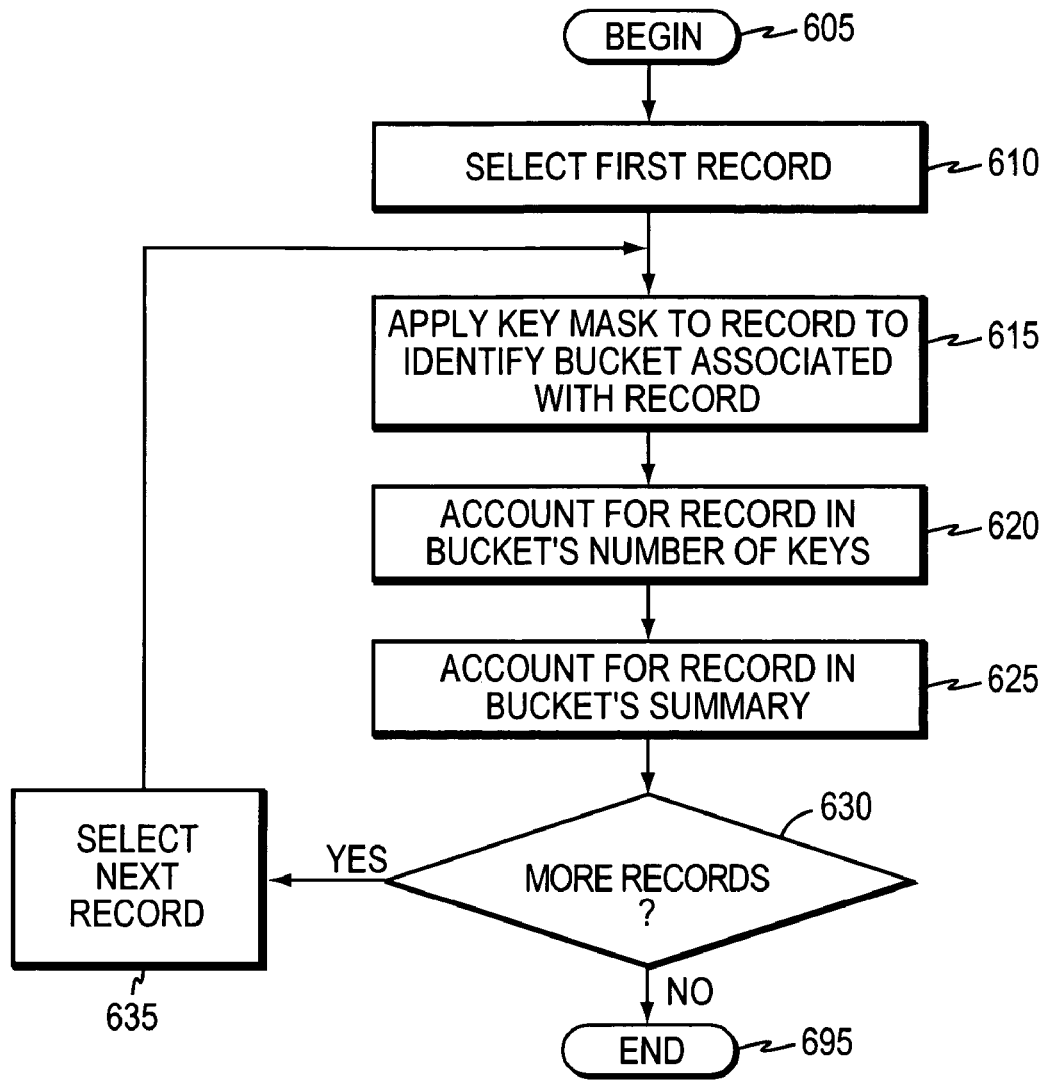
FIG. 6 is a flowchart of a sequence of steps that may be used to generate a synchronization set in accordance with an aspect of the present invention.

As noted above, a synchronization set 320 represents information contained in its associated data cache 300. FIG. 6 is a flowchart of a sequence of steps that may be used to generate a synchronization set 320 in accordance with an aspect of the present invention. The sequence begins at step 605 and proceeds to step 610 where a first record 350 in the data cache 300 is selected. Next, at step 615, the selected record 350 is associated with a bucket 330 by comparing the key masks 332 of the buckets 330 in the synchronization set 320 with the record's key 352 to identify a bucket 330 whose key mask 332 matches the record's key 352. Illustratively, a bucket's key mask 322 acts as a template that represents a range of key values that are used to determine if the record 350 should be associated with the bucket 330. If the record's key 352 falls within the range of values represented by the bucket's key mask 332, the record's key 352 is said to "match" the bucket's key mask 332 and the record 350 is assigned to (associated with) the bucket 330.

At step 620, the identified bucket's number of keys 334 is updated to account for the record 350 by illustratively incrementing it by one. At step 625, the identified bucket's summary 336 is updated to account for the record illustratively by incrementally generating a new summary value that accounts for the record 350, as described above, and replacing the contents of the summary field 336 with the new summary value.

At step 630, a check is performed to determine if there are additional records 350 in the data cache 300 that need to be processed. If not, the sequence proceeds to step 695. Otherwise, at step 635, the next record 350 is selected and the sequence returns to step 615. Steps 615-635 are repeated for all of the records 350 in the data cache 300. The sequence ends at step 695.

As is noted above, a local entity synchronizes its data cache 300 with a data cache 300 at a remote entity by generating a synchronization request message 400 containing key mask 332, number of keys 334 and summary information 336 of buckets 330 in its synchronization set 320 and transferring the message 400 to a remote entity. The remote entity receives the synchronization message 400 and processes it, including comparing the local entity's buckets 330 represented in the synchronization message 400 with its buckets 330 to determine if the local entity's data cache 300 as represented in the message 400 is in synchronization with the remote entity's data cache 300. If not, the remote entity generates and forwards a synchronization reply message 500 to the local entity wherein the message 500 contains information that the local entity uses to synchronize its data cache 300 with the remote entity's data cache 300.

Figure 7A:
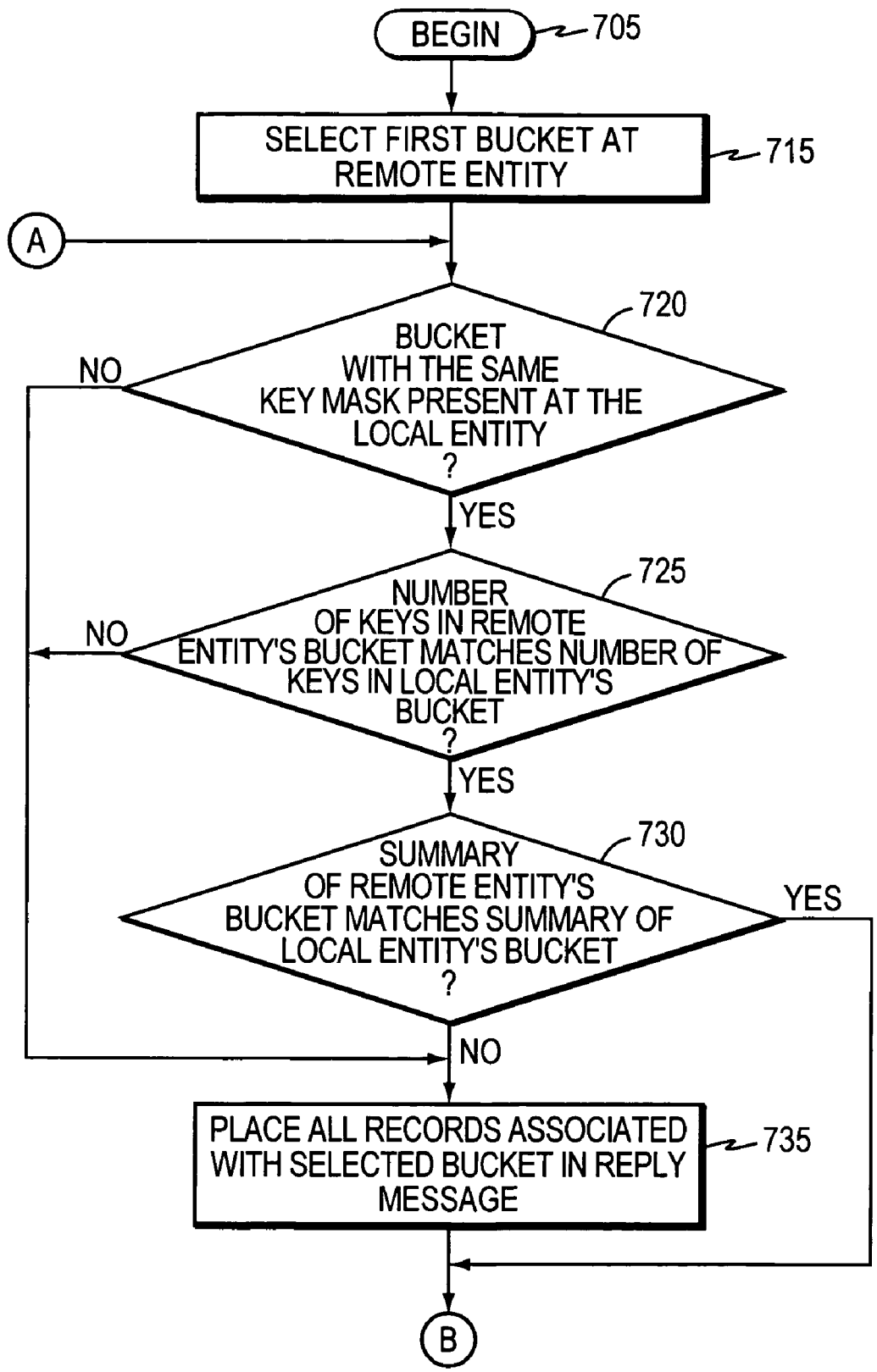
FIGS. 7A-B are a flowchart of a sequence of steps that may be used to generate a cache synchronization reply message in accordance with an aspect of the present invention.
Figure 7B:
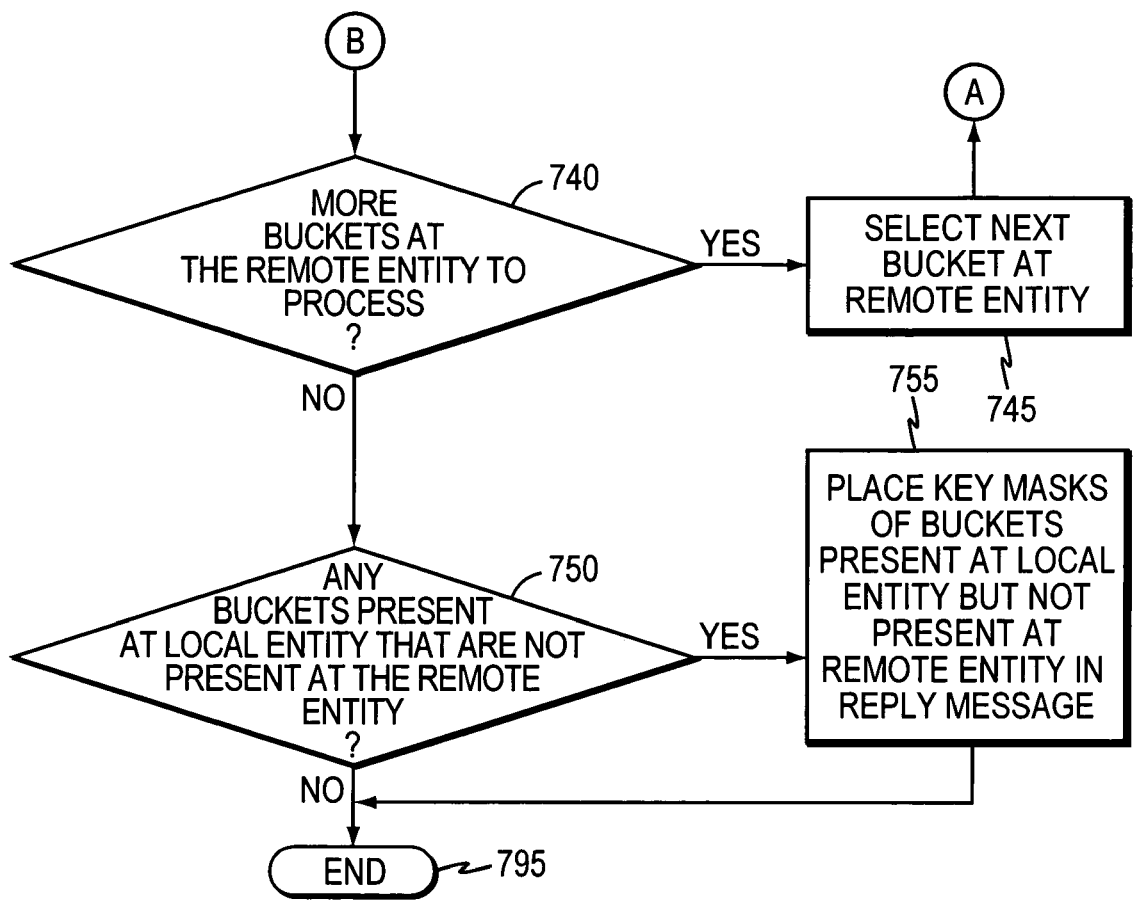

FIGS. 7A-B are a flowchart of a sequence of steps that may be used to process a synchronization message 400 and generate a synchronization reply message 500 at a remote entity in accordance with an aspect of the present invention. The sequence begins at step 705 and proceeds to step 715 where the remote entity selects the first bucket 330 in its synchronization set 320. At step 720, the remote entity determines if the selected bucket 330 is present at the local entity. Specifically, the remote entity scans the received synchronization message 400 to determine if it contains an entry 410 whose key mask 420 matches the key mask 332 of the selected bucket 330. If not, the bucket is assumed to not be present in the local entity's data cache 300 and sequence proceeds to step 735. Otherwise, the sequence proceeds to step 725 where the remote entity compares the number of keys 430 in the matching entry 410 with the selected bucket's number of keys 334 to determine if they match.

If they do not match, the buckets 330 are considered to be out of synchronization (i.e., contain different records 350) and the sequence proceeds to step 735. Otherwise, the sequence proceeds to step 730 where the remote entity compares the selected bucket's summary 336 with the summary 440 in the matching entry 410 to determine if they match. If they match, the sequence proceeds to step 740 (FIG. 7B). Otherwise, the sequence proceeds to step 735 where the key 352 and revision 354 pairs of all the records 350 associated with the selected bucket 330 and the key mask 332 associated with the selected bucket 330 are placed in the reply message 500. Specifically, for each record 350 associated with the selected bucket 330, an entry 520 is generated in the record update section 510 of the reply message 500. The key mask 332 of the selected bucket 330 and the key 352 and revision 354 of the record 350 are then placed in the key mask 530, key 535 and revision 540 fields of the entry 520, respectively.

At step 740, a check is performed to determine if there are more buckets 330 in the remote entity's data cache 300 to process. If so, at step 745, the next bucket 330 in the remote entity's data cache 300 is selected and the sequence returns to step 720. Otherwise, the sequence proceeds to step 750 where a check is performed to determine if the local entity's data cache 300 contains buckets 330 that are not present in the remote entity's data cache 300. If not, the sequence proceeds to step 795. Otherwise, at step 755, the key masks 332 of those buckets 330 that are present in the local entity's data cache 300 but not in the remote entity's data cache 300 are placed in key masks 570 of the synchronization reply message's delete record section 550. The sequence ends at step 795.

Note that in the above-described sequence of steps, inconsistencies between the local entity's data cache 300 and remote entity's data cache are determined at the bucket level. Since a bucket 330 represents a group of one or more records 350, this determination may not be granular enough to detect which specific record or records differ between the data caches. Thus, the records 350 represented in the record update section 510 of the response message 500 reflect those records 350 in the local entity's data cache 300 that are in a remote entity's bucket 330 and may or may not be in the local entity's corresponding bucket. As will be described further below, the local entity uses the record information in the update section 510 to determine which actual records 350 in its data cache 300 differ from the remote entity's data cache 300 and consequently need to be added, deleted or updated in order to make the data caches 300 consistent.

Figure 8B:
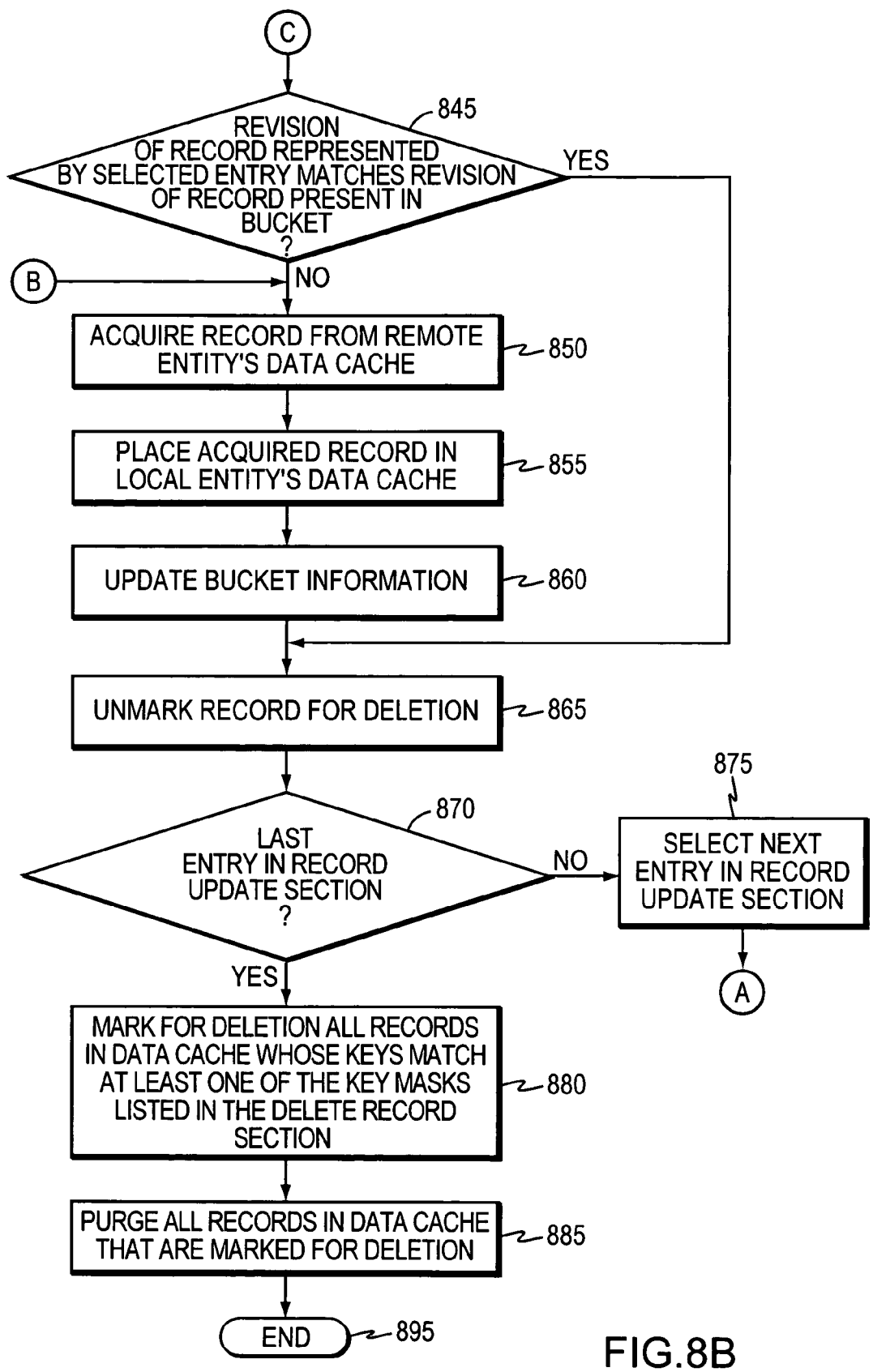

As noted above, the local entity processes a synchronization reply message 500 to synchronize its data cache 300 with the remote entity's data cache 300. FIGS. 8A-B are a flowchart of a sequence of steps that may be used by a local entity to process a synchronization reply message 500 in accordance with an aspect of the present invention. The sequence begins with step 805 and proceeds to step 810 where the local entity marks all of its data cache records 350 as not marked for deletion, as described above. At step 815, the local entity selects the first entry 520 in the record update section 510 of the synchronization reply message 500.

Next, at step 820, a check is performed to determine if a bucket 330 represented by the key mask 530 of the selected entry 520 is present in the local entity's synchronization set 320. Illustratively, this determination is made by comparing the key mask 530 of the selected entry 520 with the key masks 332 of the buckets 330 present in the local entity's synchronization set 320 to determine if a bucket 330 exists in the local entity's synchronization set 320 whose key mask 332 matches the key mask 530 of the selected entry 520. If so, the bucket 330 is considered present in the local entity's synchronization set 320. Otherwise, the bucket 330 is considered not present.

If the bucket 330 is not present in the local entity's synchronization set 320, the sequence proceeds to step 825 where the bucket 330 is generated in the local entity's synchronization set 320 and step 840. Illustratively, the bucket 330 is generated by allocating memory 220 for the bucket 330 and placing the key mask 530 of the selected entry 520 in the bucket's key mask field 332. If at step 820 it is determined the bucket 330 is present, the sequence proceeds to step 830 where a check is performed to determine if the selected entry 520 is the first entry 520 processed for the bucket 330 represented by the entry's key mask 530. If not, the sequence proceeds to step 840. Otherwise, the sequence proceeds to step 835 where all of the records 350 in the local entity's data cache 300 that are associated with the bucket 330 are marked for deletion, as described above. Note that, as will be described further below, as records 350 are processed and synchronized between the local and remote entities' caches 300 the synchronized records 350 are "unmarked" for deletion. Thus, records 350 that are present in the local entity's cache 300 but not present in the remote entity's cache 350 will remain marked for deletion. These records 350 will be purged from the local entity's cache 300.

At step 840, a check is performed to determine if the record 350 represented by the selected entry 520 is present in the local entity's data cache 300. Specifically, the key 535 value of the selected entry 520 is compared with key 352 values of records 350 in the local entity's data cache 300 to determine if a record 350 exists in the local entity's cache 300 whose key value 352 matches the selected entry's key 535 value. If not, the record 350 is considered to not be present in the local entity's data cache 300 and the sequence proceeds to step 850 (FIG. 8B). Otherwise, the record 350 is considered to be present and the sequence proceeds to step 845 (FIG. 8B) where a check is performed to determine if the revision 354 of the record 350 matches the revision 540 of the record represented in the selected entry 520. If so, the sequence proceeds to step 865, otherwise, the sequence proceeds to step 850.

At step 850, the record 350 represented by the key 535 and revision 540 fields of the selected entry 520 is acquired from the remote entity's cache 300. Illustratively, the local entity acquires the record by generating and forwarding a request message containing the key 535 and revision 540 of the selected entry 520 to the remote entity. The remote entity receives the request message, retrieves the record 350 from its data cache 300 and forwards it to the local entity in a reply message. The local entity receives the reply message and extracts the record 350 from the message.

After the local entity acquires the record 350 from the remote entity, at step 855, the local entity places the record 350 in its data cache 300. At step 860, the local entity updates the number of keys 334 and summary 336 of the bucket 330 associated with the record 350, as described above. The local entity, at step 865, then "unmarks" the record 350 for deletion, as described above.

At step 870, a check is performed to determine if the selected entry 520 is the last entry 520 in the record update section 510 of the synchronization reply message 500. If not, at step 875, the next entry 520 in the record update section 510 is selected and the sequence returns to step 825 (FIG. 8A). Otherwise, the sequence proceeds to step 880 where the local entity marks all records 350 in the local entity's data cache 300 whose keys 352 match a key mask 570 contained in the delete record section 550 of the synchronization reply message 500 for deletion, as described above. At step 885, the local entity purges all records 350 marked for deletion from its local data cache 300. The sequence ends at step 895.

Figure 9:
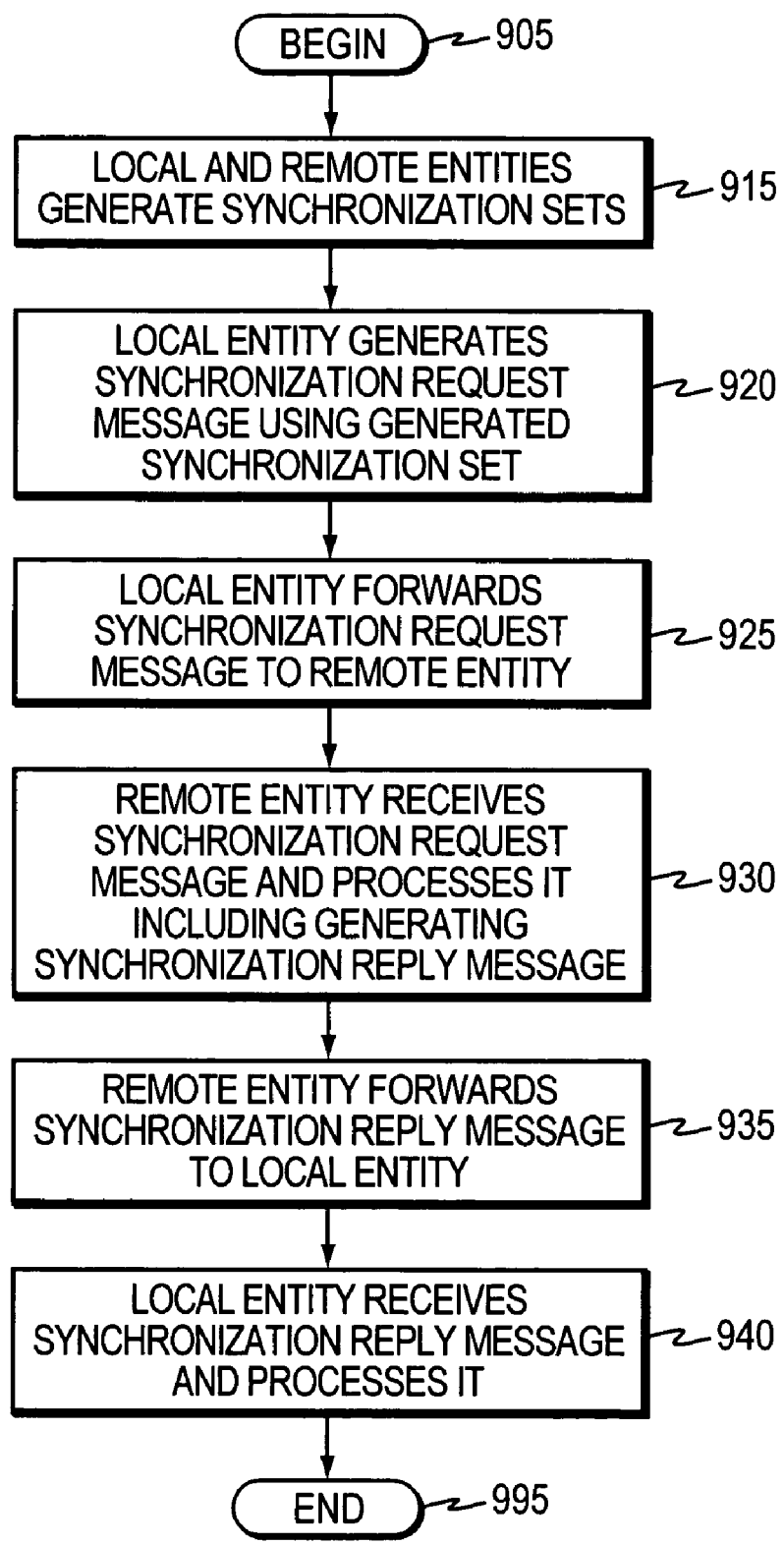
FIG. 9 is a flowchart of a sequence of steps that may be used to synchronize cache data in accordance with an aspect of the present invention.

FIG. 9 is a flowchart of a sequence of steps that may be used to synchronize a local entity's data cache 300 with a remote entity's data cache 300 in accordance with an aspect of the present invention. The sequence begins at step 905 and proceeds to step 915 where the local and remote entities generate synchronization sets 320 for their data caches 300, as described above. At step 920, the local entity generates a synchronization request message 400 containing information from its generated synchronization set 320, as described above. At step 925, the synchronization request message 400 is forwarded to the remote entity.

At step 930, the remote entity receives the synchronization request message 400 and processes it. Specifically, the remote entity uses the information in the synchronization request message 400 and the remote entity's synchronization set 320 to identify inconsistencies between the local entity's data cache 300 and the remote entity's data cache 300, as described above. The remote entity then generates a synchronization reply message 500, as described above, to report the identified inconsistencies to the local entity. At step 935, the remote entity forwards the synchronization reply message 500 to the local entity. Next, at step 940, the local entity receives the synchronization reply message 500 and processes it including using the identified consistencies reported in the reply message 500 to synchronize its data cache 300 with the remote entity's data cache 300, as described above. The sequence ends at step 995.

For example, referring to FIGS. 1 and 9, assume that distributed server 200a (local entity) wishes to synchronize its data cache 300 with the data cache 300 at the central server 200c (remote entity). Further, assume that the central server 200c has already generated a synchronization set 320 for its data cache 300, as described above. Server 200a generates a synchronization set 320, as described above (step 915). Specifically, referring to FIG. 6, the server's processor 230 (FIG. 2) selects the first record 350 in its cache 300 (step 610) and assigns the record 350 to a bucket 330, as described above (step 615). The processor 230 accounts for record 350 in the bucket's number of keys 334 (step 620) and the bucket's summary 336 (step 625), as described above. Next, the processor 230 determines if more records in the data cache 300 are to be processed (step 630). If so, the processor 230 selects the next record 350 (step 635) and processes it as described above.

After all the records 350 in the data cache 300 have been processed and the synchronization set 320 has been generated, the server 200a then generates a synchronization request message 400 (FIG. 4) using the generated synchronization set 320 (step 920). Specifically, the processor 230 places the contents of the key mask 332, number of keys 334 and summary 336 fields in the buckets 330 of the generated synchronization set 320 in the key mask 420, number of keys 430, and summary 440 fields of entries 410 in the synchronization request message 400, as described above.

Next, server 200a forwards the generated synchronization request message 400 to the central server 200c (step 925). Specifically, the processor 230 forwards the request message 400 onto network 100 via network interface 250 to the central server 200c.

The central server 200c receives the synchronization request message 400 and processes it including generating a synchronization reply message 500 (step 930), as described above. Specifically, the central server's network interface 250 receives the request message 400 and forwards it to the central server's processor 230. Referring to FIGS. 7A-B, the processor 230 selects the first bucket 330 in the synchronization set 320 at server 200c (step 715). The processor 230 then determines if a bucket 330 with the same key mask is present at the server 200a, as described above (step 720). Assuming a bucket 330 is present, the processor 230 checks the number of keys 334 and summaries 336 of the buckets, as described above (steps 725 and 730), to determine if the groups of records 350 represented by the buckets 330 are consistent.

Assuming that the processor 230 concludes the groups of records 350 are not consistent. The local processor 230 places information about the records 350 assigned to the selected bucket 330 in the synchronization reply message 500, as described above (step 735). The processor 230 repeats this process until all of the buckets 330 at the remote entity have been processed, as described above (steps 720-745). After the buckets at the remote entity have been processed, the processor 230 places key masks associated with the buckets present at server 200a but not present at server 200c in the synchronization reply message 500, as described above (steps 750 and 755).

The central server 200c then forwards the synchronization reply message 500 via its network interface 250 to server 200a (step 935). Server 200a receives the synchronization reply message 500 and processes it (step 940). Specifically, server 200a receives the synchronization reply message 500 via the network interface 250 and forwards it to its processor 230. Referring to FIGS. 8A-B, the processor 230 at server 200a then initializes all records 350 in the server's cache 300 as not marked for deletion (step 810). The processor 230 selects the first entry 520 in the record update section 510 and processes it, as described above (steps 815-875). The processor 230 continues to process the remaining entries 520 in the record update section 510 until all of the entries have been processed, as described above (steps 820-875). The processor 230 then marks all of the records 350 in the data cache 300 at server 200a that are associated with buckets represented by the key masks in the synchronization reply message's delete record section 550 for deletion, as described above (step 880). The processor 230 then purges all the records 350 marked for deletion from the data cache 300 at server 200a, as described above (step 885).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for synchronizing information contained in a first data cache at a first entity in a communication network with information contained in a second data cache at a second entity in the communication network, the method comprising:
    generating a first synchronization set wherein the first synchronization set has one or more buckets wherein each bucket is associated with one or more records contained in the first data cache and contains a summary which represents the records associated with the bucket and a key mask that is used to associate the records with the bucket;
    forwarding the first synchronization set to the second entity; and
    receiving a response from the second entity wherein the response contains information that identifies records that need to be added, updated or deleted in the first data cache in order to make information contained in the first data cache consistent with information contained in the second data cache.

2. A method as defined in claim 1 further comprising:
    using the information contained in the response to update information contained in the first data cache to be consistent with information contained in the second data cache.

3. A method as defined in claim 1 wherein the summary is an incremental checksum of information contained in the records.

4. A method as defined in claim 1 wherein each record is associated with a key that represents data contained in the record.

5. A method as defined in claim 4 further comprising:
    comparing a key associated with a record contained in the first data cache with key masks associated with the one or more buckets to identify a bucket whose key mask matches the key associated with the record; and
    associating the record with the identified bucket.

6. A method as defined in claim 5 further comprising: accounting for the record in the identified bucket's summary.

7. A method as defined in claim 5 wherein each record is associated with a revision number that represents a revision of the data contained in the record.

8. A method as defined in claim 7 further comprising:
    hashing the key and the revision number associated with the record to generate a hash value; and
    generating the identified bucket's summary using the generated hash value.

9. A method as defined in claim 5 wherein each bucket is associated with a number of keys which represents a number of records associated with the bucket.

10. A method as defined in claim 9 further comprising:
    accounting for the record in the identified bucket's number of keys.

11. A method for synchronizing information contained in a first data cache at a first entity in a communication network with information contained in a second data cache at a second entity in the communication network, the method comprising:
    receiving a request to synchronize information contained in the first data cache with information contained in the second data cache wherein the request contains a first synchronization set having one or more buckets wherein each bucket is associated with one or more records contained in the first data cache and contains a summary which represents the records associated with the bucket and a key mask that is used to associate the records with the bucket;
    generating a second synchronization set having one or more buckets wherein each bucket is associated with one or more records contained in the second data cache and contains a summary which represents the records associated with the bucket and a key mask that is used to associate the records with the bucket;
    comparing the first synchronization set with the second synchronization set to identify inconsistencies between information contained in the first data cache and information contained in the second data cache; and
    generating a response from the identified inconsistencies wherein the response contains information that identifies records that need to be added, updated or deleted in the first data cache in order to make information contained in the first data cache consistent with information contained in the second data cache.

12. A method as defined in claim 11 further comprising:
    forwarding the response to the first entity.

13. An apparatus for synchronizing information contained in a first data cache at a first entity in a communication network with information contained in a second data cache at a second entity in the communication network, the apparatus comprising:
    means for generating a first synchronization set wherein the first synchronization set has one or more buckets wherein each bucket is associated with one or more records contained in the first data cache and contains a summary which represents the records associated with the bucket and a key mask that is used to associate the records with the bucket;
    means for forwarding the first synchronization set to the second entity; and
    means for receiving a response from the second entity wherein the response contains information that identifies records in the first data cache that need to be added, updated or deleted in order to make information contained in the first data cache consistent with information contained in the second data cache.

14. An apparatus for synchronizing information contained in a first data cache at a first entity in a communication network with information contained in a second data cache at a second entity in the communication network, the apparatus comprising:
   means for receiving a request to synchronize information contained in the first data cache with information contained in the second data cache wherein the request contains a first synchronization set having one or more buckets wherein each bucket is associated with one or more records contained in the first data cache and contains a summary which represents the records associated with the bucket and a key mask that is used to associate the records with the bucket;
   means for generating a second synchronization set having one or more buckets wherein each bucket is associated with one or more records contained in the second data cache and contains a summary which represents the records associated with the bucket and a key mask that is used to associate the records with the bucket; identify inconsistencies between information contained in the first data cache and information contained in the second data cache; and
   generating a response from the identified inconsistencies wherein the response contains information that identifies records that need to be added, updated or deleted in the first data cache in order to make information contained in the first data cache consistent with information contained in the second data cache.

15. An entity in a communication network comprising:
   a network interface coupled to the communication network and configured to transfer data between the entity and the communication network;
   a first data cache; and
   a processor coupled to the first data cache and the network interface, the processor configured to:
      (a) generate a first synchronization set wherein the first synchronization set has one or more buckets wherein each bucket is associated with one or more records contained in the first data cache and contains a summary which represents the records associated with the bucket and a key mask that is used to associate the records with the bucket,
      (b) forward the first synchronization set to a second entity, and
      (c) receive a response from the second entity wherein the response contains information that identifies records that need to be added, updated or deleted in the first data cache in order to make information contained in the first data cache consistent with information contained in a second data cache.

16. An entity as defined in claim 15 wherein the processor is further configured to:
   use the information in the response to update information contained in the first data cache to be consistent with information contained in the second data cache.

17. An entity in a communication network comprising:
   a second data cache;
   a network interface coupled to the communication network and configured to receive a request to synchronize information contained in a first data cache with information contained in the second data cache wherein the request contains a first synchronization set having one or more buckets wherein each bucket is associated with one or more records contained in the first data cache and contains a summary which represents the records associated with the bucket and a key mask that is used to associate the records with the bucket;
   a processor coupled to the second data cache and the network interface, the processor configured to:
      (a) generate a second synchronization set having one or more buckets wherein each bucket is associated with one or more records contained in the second data cache and contains a summary which represents the records associated with the bucket and a key mask that is used to associate the records with the bucket,
      (b) compare the first synchronization set with the second synchronization set to identify inconsistencies between information contained in the first data cache and information contained in the second data cache, and
      (c) generate a response from the identified inconsistencies wherein the response contains information that identifies records that need to be added, updated or deleted in the first data cache in order to make information contained in the first data cache consistent with information contained in the second data cache.

18. An entity as defined in claim 17 wherein the processor is further configured to:
   forward the response to the first entity.

19. A computer program product comprising a computer-readable medium having computer-readable program code stored thereon, including program code which, when executed, causes one or more processors to perform the steps of:
   generating a first synchronization set wherein the first synchronization set has one or more buckets and each bucket is associated with one or more records contained in a first data cache and contains a summary which represents the records associated with the bucket and a key mask that is used to associate the records with the bucket;
   forwarding the first synchronization set to a remote entity; and
   receiving a response from the remote entity wherein the response contains information that identifies records that need to be added, updated or deleted in the first data cache in order to make information contained in the first data cache consistent with information contained in a second data cache.

20. A computer program product comprising a computer-readable medium having computer-readable program code stored thereon, including program code which, when executed, causes one or more processors to perform the steps of:
   receiving a request to synchronize information contained in a first data cache with information contained in a second data cache wherein the request contains a first synchronization set having one or more buckets wherein each bucket is associated with one or more records contained in the first data cache and contains a summary which represents the records associated with the bucket and a key mask that is used to associate the records with the bucket;
   generating a second synchronization set having one or more buckets wherein each bucket is associated with one or more records contained in the second data cache and contains a summary which represents the records associated with the bucket and a key mask that is used to associate the records with the bucket;
   comparing the first synchronization set with the second synchronization set to identify inconsistencies between information contained in the first data cache and information contained in the second data cache; and generating a response from the identified inconsistencies wherein the response contains information that identifies records that need to be added, updated or deleted in the first data cache in order to make information contained in the first data cache consistent with information contained in the second data cache.

* * * * *

UNITED STATES PATENT AND TRADEMARK OFFICE
CERTIFICATE OF CORRECTION

| | |
|---|---|
| PATENT NO. | : 7,421,542 B2 |
| APPLICATION NO. | : 11/344679 |
| DATED | : September 2, 2008 |
| INVENTOR(S) | : Mickael J. Graham et al. |

It is certified that error appears in the above-identified patent and that said Letters Patent is hereby corrected as shown below:

Column 15

Line 22, insert --means for comparing the first synchronization set with the second synchronization set to-- before the word "identify".

Signed and Sealed this

Twenty-eighth Day of October, 2008

JON W. DUDAS
*Director of the United States Patent and Trademark Office*